Figure 1:
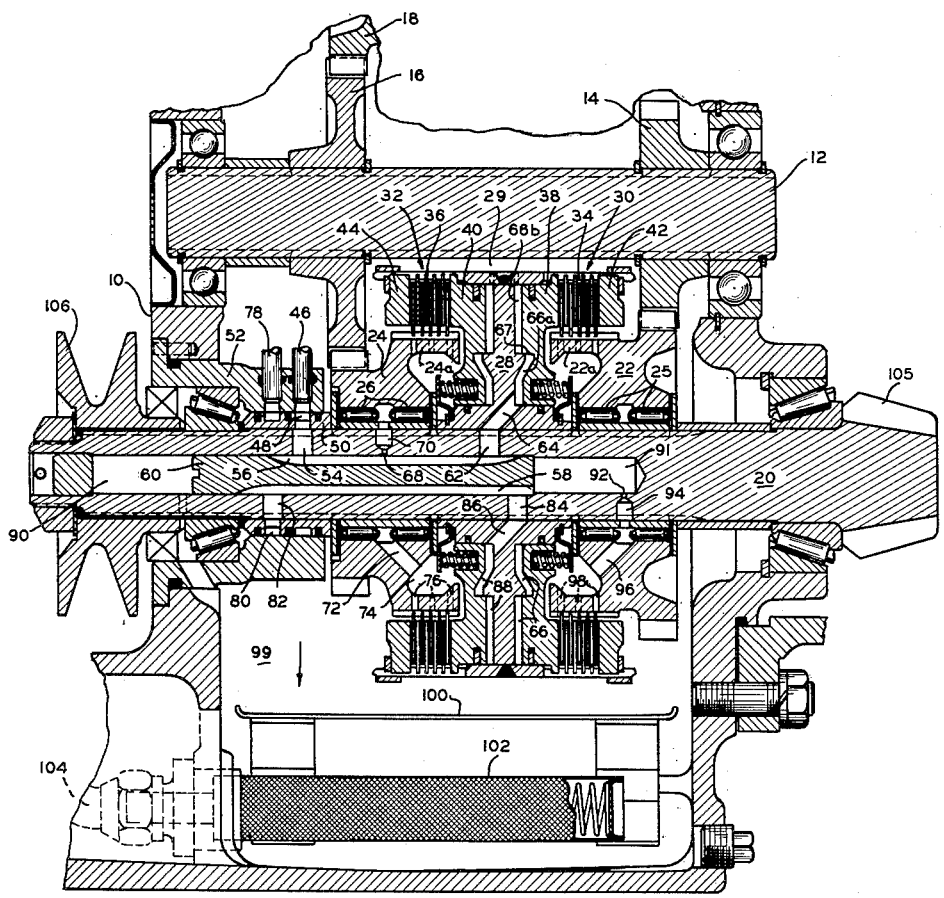

Jan. 16, 1962 D. S. DENCE ETAL 3,017,006
CLUTCH MECHANISM
Filed Oct. 1, 1959

INVENTORS.
DONALD S. DENCE
FRANCIS L. METZ
BY
Kenneth C. Witt
ATTORNEY

United States Patent Office 3,017,006
Patented Jan. 16, 1962

3,017,006
CLUTCH MECHANISM
Donald S. Dence and Francis L. Metz, Jackson, Mich., assignors to Clark Equipment Company, a corporation of Michigan
Filed Oct. 1, 1959, Ser. No. 843,814
1 Claim. (Cl. 192—113)

This invention relates to friction clutch mechanisms, and more particularly to such mechanisms embodying at least two fluid actuated clutches.

The invention is described and illustrated herein as applied to a pair of multiple disc clutches surrounding a common shaft. However, it will be understood that the invention is not limited to such clutches.

It is common in many power shifted transmissions for automotive vehicles and in other mechanisms as well to utilize two or more multiple disc clutches. Such clutches may be engaged one at a time or in various combinations to select the desired gear ratios through such transmission or other mechanism. It is known, too, that in such a mechanism a disengaged or idle clutch, particularly if it is of the multiple disc type, may overheat if there is relative rotation between the adjacent alternate discs. Such overheating results from rubbing or frictional contact between such adjacent discs which may remain in contact when the clutch assembly is in the disengaged condition.

In some situations such frictional contact and the resultant heating have caused the discs to wrap or otherwise be deformed and thereby increase the frictional contact and heating with the ultimate result that the cumulative action caused the clutch to burn out or in some cases to produce a false engagement.

The principal object of the present invention is to provide means for cooling the inactive clutch in a mechanism embodying two or more selectively operable clutch assemblies.

Further objects and advantages of the present invention will be apparent from the following description taken in conjunction with the accompanying drawing.

In carrying out our invention in one form, we provide a clutch mechanism which includes a rotatable shaft and a pair of fluid actuated multiple disc friction clutch assemblies surrounding such shaft. Passageway and conduit means are provided in the shaft and other parts for admitting fluid to one clutch assembly for producing engagement thereof and simultaneously directing fluid to the friction surfaces of the other clutch assembly for cooling such friction surfaces.

For a clearer and more complete understanding of our invention reference should be had to the accompanying drawing illustrating a preferred embodiment of the invention, in which the single figure is a longitudinal vertical sectional view through a portion of a transmission embodying the present clutch mechanism.

FIGURE 1 of the drawing shows a fragmentary view of a power shifted transmission intended specifically for a fork lift truck although it will be readily appreciated that the present invention is not limited to such application. The portion of the transmission illustrated includes two parallel shafts carrying constantly meshing gears and a clutch mechanism including two clutch assemblies which provides for selecting either of two gear ratios between the two shafts illustrated.

The transmission housing or casing is indicated by the numeral 10. The upper rotatable shaft is identified by the numeral 12 and shaft 12 carries a pair of gears 14 and 16 which are splined to and rotate with it. As illustrated shaft 12 is rotated by means of a gear 18, only a portion of which is visible, which is in constant mesh with gear 16 so that when the gear 18 is turned the gear 16, shaft 12, and gear 14 turn also.

The other shaft which may be termed the output shaft is indicated by the numeral 20. Shaft 20 has a pair of gears 22 and 24 rotatably mounted thereon by means of roller or needle bearings 25 and 26 respectively. Gears 22 and 24 are in constant mesh with gears 14 and 16 respectively and provide the means for operating output shaft 20 at a selected gear ratio when one of gears 22 or 24 is clutched to shaft 20. It will be apparent that gears 14, 22 provide for a larger gear reduction, or in other words a lower speed of shaft 20 for a given speed of shaft 12, then gears 16, 24. Between gears 22 and 24 a web member 28 is splined to shaft 20 for rotation therewith. Member 28 is secured against longitudinal movement with respect to shaft 20.

Two clutch assemblies indicated generally by the numerals 30 and 32 are provided on either side of member 28 and between this member and the respective gears. These clutch assemblies are of known construction with each including a plurality of interleaved discs or plates 34, such discs being identified collectively by the numeral 34 for clutch assembly 30 and by the numeral 36 for clutch assembly 32. Alternate discs of each such stack of discs are splined to an outer cylinder member 29 which is secured to member 28 and rotatable with member 28 and in effect forms axial extension drum portions on each side of member 28. The discs which are splined to portion 29 rotate with member 28 and shaft 20 while being movable axially. The intervening discs are splined to axial extension portions 22a and 24a on the gears 22 and 24, and thus rotate with the respective gears, but are movable axially. A pair of pistons, 38 and 40 respectively, are provided for compressing disc packs 34 and 36 and thereby applying clutch 30 or 32 as desired, a pair of stop members or backing plates 42 and 44 being provided at the ends of member 29 and secured thereto in a suitable manner such as by snap rings, against which the pistons 38 and 40 act.

To apply clutch 30, oil or other suitable fluid under pressure is admitted through a conduit 46, only a portion of which appears in the drawing, it being understood that a suitable control valve (not shown) is provided to admit such pressurized fluid only when clutch 30 is to be applied. From conduit 46 the pressurized fluid flows into an annular passage 48 on the outer surface of a ring 50 which is splined to shaft 20 and rotates therewith. Suitable sealing means is provided between ring 50 and an inwardly projecting portion 52 on the transmission housing to which conduit or tube 46 is sealed. From annular passage 48 the pressurized fluid flows through a radially extending passage 54 into a longitudinal passage 56 within shaft 20. Passage 56 and passage 58, the purpose of which is described hereinafter, are formed in shaft 20 by drilling such shaft from the left end to form an opening 90 as illustrated in the drawing and inserting in such drilled opening a "spool" member 60 which has previously been chilled in order to shrink it. Member 60 is provided with longitudinal slots which form the passages 56 and 58 after it is inserted in the opening in shaft 20. Member 60 is made of such size that after it is inserted in the opening in the shaft and expanded by allowing its temperature to become the same as the temperature of the shaft, it is held securely within the shaft in sealing relation therewith and thus provides the longitudinal passageways 56 and 58.

From passage 56 the liquid flows through radially extending passageway 62 and through slanted passageway 64 in member 28 to chamber 66 between piston 38 and member 28. It will be noted that chamber 66 is in two parts, both parts being annular in configuration, the inner part being identified by the numeral 66a and the outer part by 66b. The two parts of the chamber are separated in the unapplied position of the clutch by the sliding mating structural portions indicated at 67 on the drawing. As piston 38 moves to the right under the force resulting from the admission of pressurized fluid to the operating chamber, communication is established between parts 66a and 66b of the chamber. The effect of this arrangement is to produce a lower force for the first portion of clutch engaging movement of the piston when only fluid in chamber part 66a is acting, which produces a relatively "soft" engagement of the clutch, but when fluid is admitted also to part 66b, the force is greatly increased to provide for holding the clutch securely in engagement without slippage. The engagement of the clutch 30 connects shaft 20 to gear 22 for rotation therewith at a speed which is dependent upon the gear ratio of gears 14 and 22.

Fluid is also admitted from passageway 56 simultaneously through an orifice 68 which restricts the flow, thence through a radial passageway 70 in the shaft from whence it flows through the bearings 26 to lubricate them and also through a slanted passageway 72 (see the bottom portion of gear 24) and into the cavity portion 74 formed by the axial extension 24a of gear 24. From cavity 74 such fluid flows by gravity and the action of centrifugal force through openings 76 in portion 24a and thence between the friction surfaces of the clutch plates 36 to cool and lubricate such clutch plates.

When it is desired to actuate the other clutch 32 fluid is admitted through a conduit 78 to an annular opening 80 in ring 50 from whence it flows through a radial opening 82 in the shaft into longitudinal passageway 58 and from there through another radial opening 84 in the shaft and through slanted conduit 86 in member 28 to chamber 88 between member 28 and piston 40. Such pressurized fluid moves piston 40 to the left to compress the discs 36 against stop 44 which connects gear 24 to shaft 20 for rotation of the shaft at a higher speed inasmuch as the ratio between gears 16 and 24 is less than that between 14 and 22. The admission of pressurized fluid to passageway 58 also causes fluid to flow into extension portion 91 of opening 90 in shaft 20 and from there through an orifice 92 and radially extending opening 94 in shaft 20 for lubricating bearings 25. Such fluid also flows through passageway 96 and on through additional passageways 98 to cool and lubricate clutch discs 34.

The fluid which is discharged after cooling the respective clutch plates falls into a sump 99 formed at the bottom of the housing 10. As illustrated a slotted baffle plate 100 is provided to prevent aeration of the fluid around the clutches while a screen 102 is provided to remove dirt and other particles from the fluid. Such fluid is then removed from the sump to a conduit 104 by means of a pump (not shown) for recirculation through the transmission and clutches.

As illustrated shaft 20 has a pinion gear 105 at the right end which is used for driving the ring gear of a drive axle differential, while a sheave-like member 106 which is installed at the opposite end of shaft 20 serves as a portion of the parking brake.

It will be readily apparent from the foregoing description that this invention provides a reliable method of cooling one of the clutch packs while the other clutch is engaged in order to avoid undue wear, heating or false engagement of the inactive clutch due to relative rotation of the discs comprising the inactive clutch. This mechanism provides automatic cooling and lubrication of such inactive clutch during the intervals when it is required with little additional structure beyond that which is required in any event in such a clutch mechanism. Thus it solves a potentially serious clutch problem in a very simple and low-cost manner.

It will be understood by those skilled in the art that modifications may be made of this invention. For example, while the mechanism described and illustrated herein provides for the rotation of shaft 20 by rotation of shaft 12, at different selectable speed ratios, it will be appreciated that the mechanism may be reversed in this respect so that shaft 20 is the driving shaft and shaft 12 the driven shaft. It is intended to cover by the appended claim all such modifications which fall within the true spirit and scope of this invention.

We claim:

In a transmission mechanism, a rotatable shaft having a longitudinal opening extending thereinto from one end and having first and second gears rotatably mounted thereon, an annular web member secured to the shaft between the said gears and rotatable with the shaft, a pair of clutch drum portions affixed to the said web member and extending axially therefrom in opposite directions, a pair of multiple disc clutch assemblies located on opposite sides of the said web member within the said clutch drum portions respectively and arranged to connect the said gears selectively to the said web member for conjoint rotation with the shaft, each said clutch assembly including a plurality of friction discs with alternate discs splined to the said clutch drum portions and the intervening discs splined to the respective gears, each clutch assembly including also a piston slidable within its drum portion and forming a chamber with such drum portion and the said web member, a spool member expandibly fitted in the said longitudinal opening in the shaft, the said spool member having two longitudinal slots in the outer surface thereof forming with the walls of the said opening two longitudinally extending passageways in the said shaft which are not in communication with each other, first conduit means for admitting pressurized fluid to one of said chambers for engaging one clutch assembly and connecting one gear for the conjoint rotation with the shaft, said first conduit means including a first one of the said longitudinal pasageways in the shaft, a first radial opening in the said shaft communicating with the said first longitudinal passageway and an opening through said web member communicating with said first radial opening and said one chamber, a second radial opening in the said shaft communicating with the said first longitudinal passageway, said second opening including an orifice for restricting fluid flow, and passageway means in the said other gear communicating with the said second radial opening for directing fluid from the said first longitudinal passageway to the friction surfaces of the said other clutch assembly for cooling and lubricating such friction surfaces when the said one clutch assembly is engaged, second conduit means for admitting pressurized fluid to the other of said chambers for engaging the other clutch assembly and thereby connecting the said other gear for conjoint rotation with the shaft, said second conduit means including the second longitudinal passageway in the said shaft, a third radial opening in the said shaft communicating with said second longitudinal passageway and an additional opening through said web member communicating with said third radial opening and said other chamber, a fourth radial opening in the said shaft communicating with the said second longitudinal passageway, said fourth opening including an orifice for restricting fluid flow, and additional passageway means in the said one gear communicating with the said fourth radial opening for directing fluid from the said second longitudinal passageway to the friction surfaces of the said one clutch assembly for cooling and lubricating such friction surfaces when the said other clutch assembly is engaged.

References Cited in the file of this patent

UNITED STATES PATENTS

| | | |
|---|---|---|
| 1,789,271 | Cappa | Jan. 13, 1931 |
| 2,142,529 | Smith | Jan. 3, 1939 |
| 2,632,544 | Hockert | Mar. 24, 1953 |
| 2,864,479 | Schindler | Dec. 16, 1958 |
| 2,922,314 | Johnson et al. | Jan. 26, 1960 |

FOREIGN PATENTS

| | | |
|---|---|---|
| 757,190 | Germany | Oct. 27, 1952 |